United States Patent [19]
Stein et al.

[11] Patent Number: 5,560,112
[45] Date of Patent: Oct. 1, 1996

[54] DOOR TEMPLATE

[76] Inventors: Dale M. Stein, 1078 Falconcrest Dr., Lawrenceville, Ga. 30243; Herman Harmon, 243 Jamestown Ct., Lilburn, Ga. 30247

[21] Appl. No.: 404,555

[22] Filed: Mar. 15, 1995

[51] Int. Cl.⁶ ............................................. E04F 21/00
[52] U.S. Cl. ............................................. 33/194; 33/667
[58] Field of Search ........................... 33/194, 286, 404, 33/406, 407, 562, 645, 667

[56] References Cited

U.S. PATENT DOCUMENTS

| | | | |
|---|---|---|---|
| 2,502,166 | 3/1950 | McKay | 33/194 |
| 2,679,696 | 6/1954 | Reeder, Jr. | 33/194 |
| 2,867,911 | 1/1959 | Atkinson | 33/194 |
| 2,949,948 | 8/1960 | Zern | 33/194 |
| 3,246,399 | 4/1966 | Southern | 33/667 |
| 3,284,912 | 11/1966 | Hoven | 33/667 |
| 4,707,925 | 11/1987 | Engelhart | 33/562 |
| 4,794,700 | 1/1989 | Kessel | 33/194 |
| 4,873,769 | 10/1989 | Casanave | 33/194 |
| 5,167,073 | 12/1992 | Stein | 33/194 |

FOREIGN PATENT DOCUMENTS 2250769  6/1992  United Kingdom ................. 33/194

*Primary Examiner*—William A. Cuchlinski, Jr.
*Assistant Examiner*—G. Bradley Bennett
*Attorney, Agent, or Firm*—Barnes, Kisselle, Raisch, Choate, Whittemore & Hulbert, PC

[57] ABSTRACT

A door template for use in cutting a door to fit in a door jamb. The template has inner and outer upright members. A horizontal top rail is secured to the upper ends of the upright members in vertically adjusted position. A horizontal bottom rail is secured to the lower ends of the upright members in vertically adjusted position. Each rail has an outwardly extending horizontal extension bar. The inner upright member has a vertical inner edge. The top rail has a horizontal top edge. The bottom rail has a horizontal bottom edge. The template, after suitable adjustment, is adapted to be laid over a door blank and the proper door size transferred to the door blank by running a marker or the like along the inner edge of the inner upright member, the top and bottom edges of the top and bottom rails, and a straight edge connecting the outer ends of the top and bottom extension bars. The template also includes a drill plate with holes for guiding a drill to form holes in the door for hardware.

2 Claims, 2 Drawing Sheets

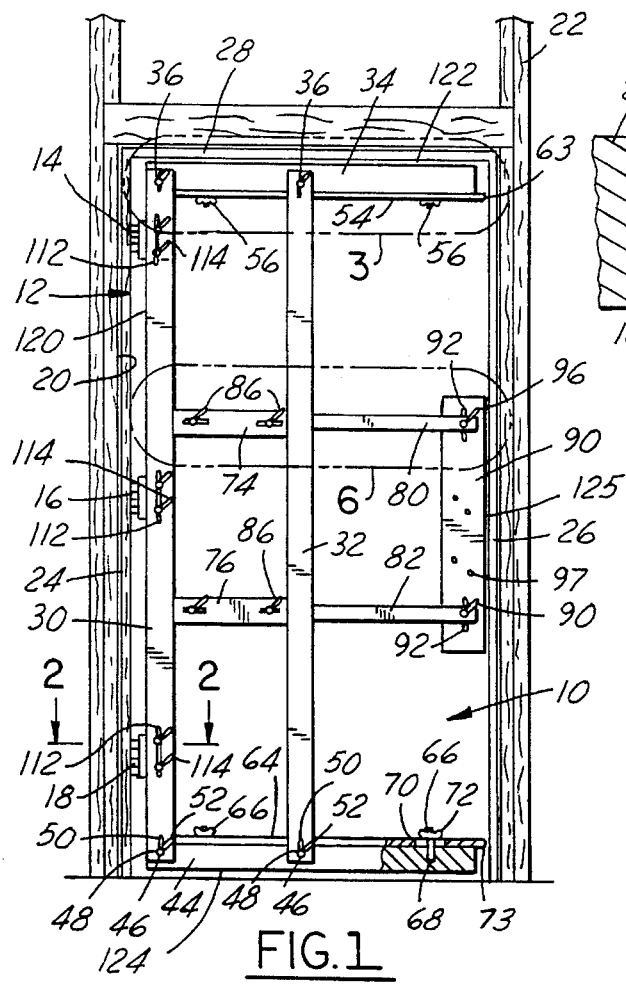
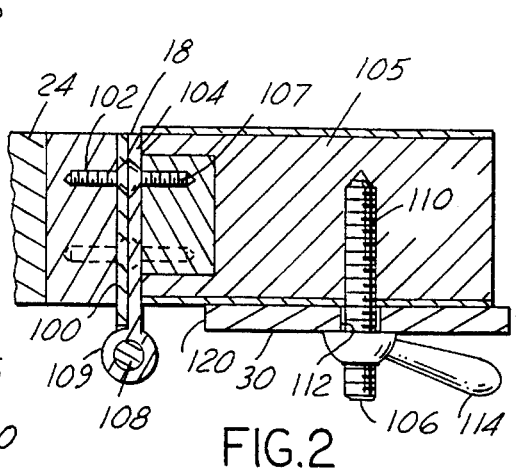
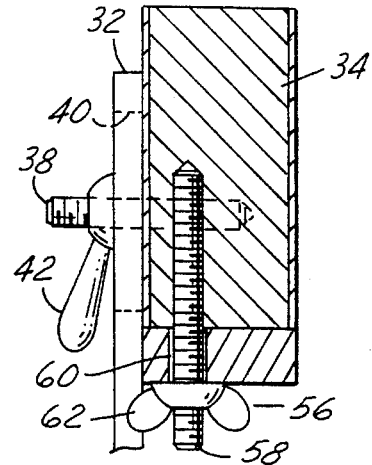
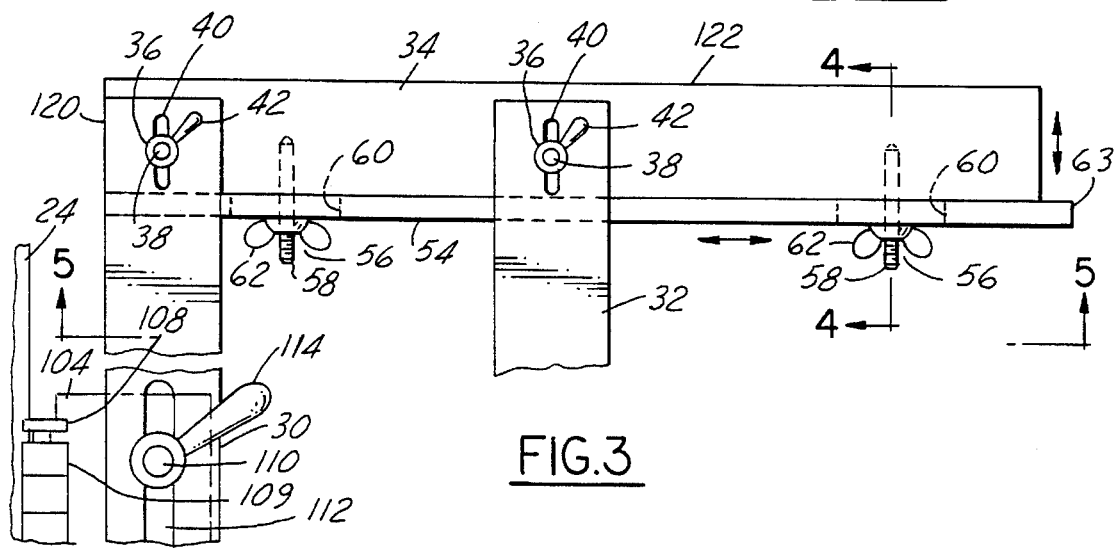

DOOR TEMPLATE

FIELD OF THE INVENTION

This invention relates to a template for use in cutting a door to proper size to fit in a door jamb.

BACKGROUND AND SUMMARY

Cutting a door to fit in a door jamb usually requires taking careful measurements of the jamb opening, estimating the clearance space needed along the sides, top and bottom of the door jamb, and then using these measurements and estimates to cut the door from a door blank. This procedure is not always accurate because of irregularities in the door jamb and the lack of perpendicularity of the sides of the door jamb, and is always time consuming.

To reduce the time required and to increase the accuracy of cutting a door to proper size, what is needed is an adjustable door template.

The door template of this invention is designed so that it may be hinged in the door jamb while the adjustments are made. Preferably, the template has a pair of laterally spaced, vertical upright members. Top and bottom horizontal rails are secured to the upper and lower ends of the upright members in vertically adjusted position, the rails having horizontal extension bars which are horizontally adjustable. The top and bottom rails are adjusted vertically to the desired spacing from the top of the door jamb and the floor. The extension bars are adjusted horizontally so that their outer ends are spaced properly from the side of the door jamb opposite the hinge side. After suitable adjustment, the template is removed from the jamb, laid over a door blank, and the proper door size transferred to the door blank by running a marker such as a knife or pen, along the periphery of the template. The door blank is then cut along the marked lines to form a door of proper size to fit the jamb.

Intermediate horizontal rails, with horizontally adjustable extension bars to mount a drill plate, may also be provided. The drill plate has holes for guiding a drill in forming holes in the door for hardware.

One object of this invention is to provide a door template having the foregoing features and capabilities.

Another object is to provide a door template which is composed of a relatively few simple parts, is rugged and durable in use, can be inexpensively manufactured, and is capable of being quickly and easily operated.

These and other objects, features and advantages will become more apparent as the following description proceeds, especially when considered with the accompanying claims and drawings.

BRIEF DESCRIPTION OF THE DRAWINGS

FIG. 1 is an elevational view of a door template constructed according to this invention, shown mounted in a door jamb.

FIG. 2 is a fragmentary sectional view taken on the line 2—2 in FIG. 1.

FIG. 3 is an enlargement of the portion of FIG. 1 shown within the border line 3.

FIG. 4 is a sectional view taken on the line 4—4 in FIG. 3.

DETAILED DESCRIPTION OF THE PREFERRED EMBODIMENT

Figure 5:
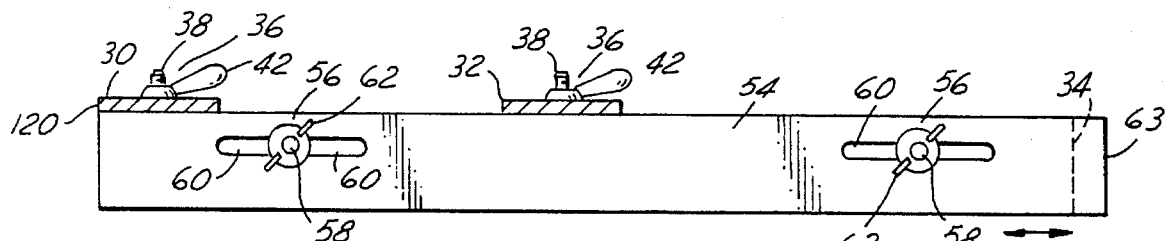
FIG. 5 is a sectional view taken on the line 5—5 in FIG. 3.
Figure 6:
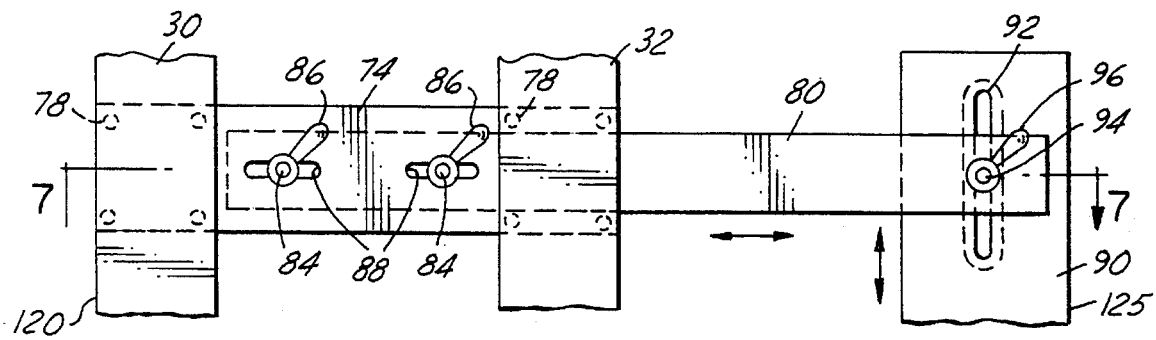
FIG. 6 is an enlargement of the portion of FIG. 1 shown within the border line 6.
Figure 7:
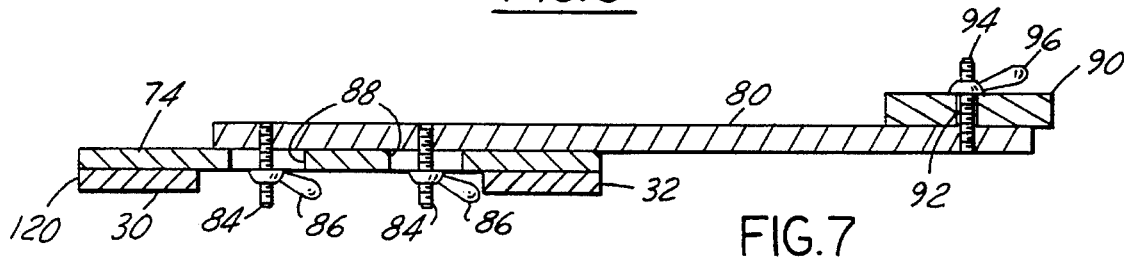
FIG. 7 is a sectional view taken on the line 7—7 in FIG. 6.
Figure 8:
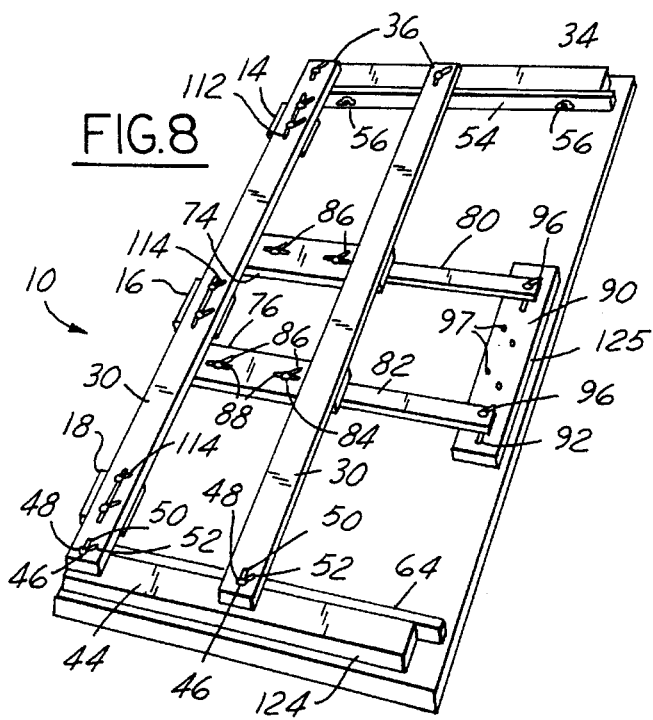
FIG. 8 is a perspective view of the door template after it has been adjusted and removed from the door jamb, and laid over a door blank so that the proper door size can be transferred to the blank.
Figure 9:
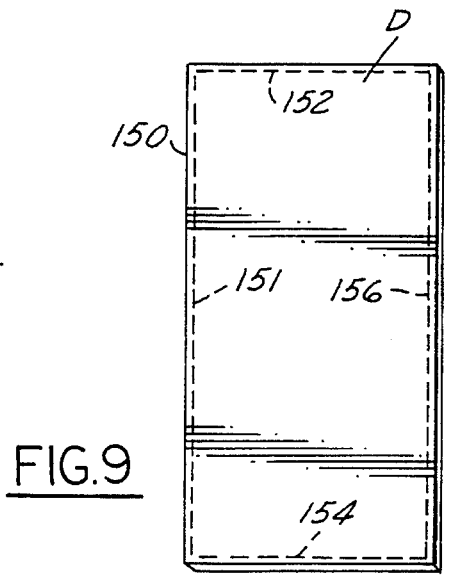
FIG. 9 is a perspective view showing the door blank with an outline shown in dotted lines to indicate where the blank is to be cut to form a door.

Referring now more particularly to the drawings, the door template 10 of this invention is shown hung in a door jamb 12, being supported in the jamb on the vertically spaced hinges 14, 16 and 18 normally used to pivotally support a door.

The door jamb 12 is located in an opening 20 of a wall 22. The door jamb has laterally spaced apart, vertical side strips 24 and 26 along opposite sides of the opening, and a connecting horizontal top strip 28 along the top of the opening. The hinges 14, 16 and 18 are mounted on the side strip 24 of the jamb.

The template 10 comprises an inner elongated upright member 30 and an outer elongated upright member 32 spaced laterally outwardly from the inner upright member 30. The upright members 30 and 32 are disposed vertically in laterally spaced relation to one another.

An elongated, horizontal top rail 34 extends between the upright members 30 and 32 and is secured thereto by fasteners 36. The fasteners 36 have threaded studs 38 carried by the top rail 34 which extend through vertically elongated slots 40 in the upper ends of the upright members 30 and 32. Wing nuts 42 threaded in studs 38 secure the top rail 34 to the upper ends of the upright member in vertically adjusted position.

An elongated, horizontal bottom rail 44 extends between the upright members 30 and 32 and is secured thereto by fasteners 46. The fasteners 46 have threaded studs 48 carried by the bottom rail 44 and extend through vertically elongated slots 50 in the lower ends of the upright member 30 and 32. Wing nuts 52 threaded on studs 48 secure the bottom rail 44 to the lower ends of the upright member in vertically adjusted position.

An elongated, horizontal top extension bar 54 is parallel to the top rail 34. The top extension bar 54 is secured to the top rail 34 by fasteners 56. The fasteners 56 have threaded studs 58 carried by the top rail 34 which extend through horizontally elongated slots 60 in the top extension bar 54. Wing nuts 62 threaded on the studs 58 secure the top extension bar 54 to the top rail 34 in horizontally adjusted position. The top extension bar 54 has a laterally outer end 63 which is adapted to extend laterally outwardly beyond the top rail 34.

An elongated, horizontal bottom extension bar 64 is parallel to the bottom rail 44. The bottom extension bar 64 is secured to the bottom rail 44 by fasteners 66. The fasteners 66 have threaded studs 68 carried by the bottom rail 44 which extend through horizontally elongated slots 70 in the bottom extension bar 64. Wing nuts 72 threaded on the studs 68 secure the bottom extension bar 64 to the bottom rail 44 in horizontally adjusted position. The bottom extension bar 64 has a laterally outer end 73 which is adapted to extend laterally outwardly beyond the bottom rail 44.

A pair of elongated horizontal intermediate rails 74 and 76 are provided between the top and bottom rails 34 and 44, being secured to the upright members 30 and 32 in vertically spaced relation to one another by fasteners 78.

Intermediate extension bars 80 and 82 are parallel to the respective intermediate rails 74 and 76. The extension bars 80 and 82 are secured to the respective intermediate rails 74 and 76 by fasteners consisting of threaded studs 84 and wing nuts 86. The studs 84 are carried by the extension bars 80 and 82 and extend through horizontally elongated slots 88 in the intermediate rails. The wing nuts 86 are threaded on the studs 84 and tightened to secure the intermediate extension bars 80 and 82 to the intermediate rails 74 and 76 in horizontally adjusted position.

The intermediate extension bars 80 and 82 mount a vertically elongated rectangular drill plate 90 on their laterally outer ends. The drill plate 90 has two aligned, vertically spaced, vertically elongated slots 92. Threaded studs 94 carried by the outer ends of extension bars 80 and 82 project through the slots 92. Wing nuts 96 threaded on studs 94 secure the drill plate 90 to the extension bars 80 and 82 in vertically adjusted position. The drill plate 90 is provided with drill holes 97 for locating a drill to drill holes in a door for hardware.

Hinges 14, 16 and 18 have hinge plates 100 secured to the side strip 24 of the jamb by fasteners 102. The hinge plates 104 are secured to blocks 105 by fasteners 107. Blocks 105 are secured to the back of the upright member 30 of the template by fasteners 106. Hinge plates 100 and 104 are joined by hinge pins 108 in hinge knuckles 109. The fasteners 106 have threaded studs 110 projecting from the blocks 105 through vertically elongated, vertically spaced slots 112 in upright member 30. Wing nuts 114 threaded on the studs 110 secure the upright member 30, and hence the entire template, to the hinge plates 104 in vertically adjusted position.

The inner upright member has a vertical inner edge 120 beyond which the hinge plate 104 is spaced inwardly. The top rail 34 has a top horizontal edge 122. The bottom rail 44 has a bottom horizontal edge 124. The drill plate 90 has an outer vertical edge 125.

To use the template, an existing door to be replaced, if there is one, is removed by removing the hinge pins but leaving the hinge plates 100 in place. The template 10 is then placed in the jamb. The hinge plates 104 on blocks 105 are attached to hinge plates 100 by hinge pins 108. The hinge blocks 105 attached to the upright member 30 have the studs 110 projecting through the slots 112 in the upright member. The wing nuts 114 are tightened so as to position the template in the jamb in vertically adjusted position.

Next, the top horizontal bar 34 is adjusted vertically by loosening and then tightening the wing nuts 42, after which the bottom horizontal bar 44 is similarly adjusted vertically by loosening and then tightening the wing nuts 52. The top horizontal bar 34 is placed in relationship to the top strip 28 of the jamb to provide the desired clearance, preferably by using a spacer to maintain a proper spaced distance between the upper edge 122 of the top horizontal bar 34 and the top strip 28 of the door jamb. The position of the bottom horizontal bar 44 is similarly adjusted vertically by means of a spacer to provide the desired spacing between the bottom edge 124 of the bottom horizontal bar 44 and the floor.

The top and bottom extension bars 54 and 64 are adjusted horizontally by loosening and then tightening the fasteners 56 and 66 to position the outer ends 63 and 73 of the extension bars in proper spaced relation to the vertical strip 26 of the door jamb. Again, a suitable spacer may be used for this purpose.

Then the intermediate horizontal extension bars 80 and 82 are adjusted horizontally by loosening and then tightening the wing nuts 86 to position the drill plate 90 properly, preferably so that its outer edge 125 is aligned with the outer ends 63 and 73 of the upper and lower extension bars 54 and 64. This can be done by use of a similar spacer between the edge 125 of the drill plate and the jamb strip 26. The wing nuts 96 are tightened to position the drill plate 90 vertically in the proper position so that the drill holes 97 are located properly for drilling holes in a door for hardware.

The template is removed from the door jamb by removing the hinge pins 108, after which the template is laid over a door blank D. Then with a marker such as a knife or a pen, a marking or cut line is made along the left edge of the blank where indicated at 151 by running the marker along a straight edge aligned with hinge plates 104, then along the top edge of the blank where indicated at 152 by running the marker along the upper edge 122 of the top horizontal rail 34. Similarly, a bottom cut line 154 may be marked on the blank by running the marker along the lower edge 124 of the bottom horizontal rail 44. A straight edge may be laid on the template so as to connect the outer ends 63 and 73 of the upper and lower extension bars 54 and 64 and the line 156 marked on the door blank. Preferably, the outer edge 125 of the drill plate 90 is aligned with the straight edge for this purpose. Drill holes are then formed in the door blank by a drill guided by the drill holes 97.

Of course, it will be understood that during the marking of the outline of the door on the door blank by use of the template, the template should be clamped in position over the door blank. At the same time, the door blank may rest on a sawhorse or like supporting surface preferably with the inner side facing up. After unclamping and removing the template, the door blank is milled along the lines 151, 152, 154 and 156 to provide a finished door which may be hung on the hinges 14, 16 and 18 as will be readily understood.

We claim:

1. A door template for cutting a door to proper size to fit a door jamb, comprising:

an inner elongated upright member, an outer elongated upright member spaced laterally outwardly from said inner upright member, said upright members being disposed vertically in laterally spaced apart, parallel relation, said inner upright member having a vertical inner side edge remote from said outer upright member, an elongated horizontal top rail extending from said inner upright member to said outer upright member, means securing said top rail to the upper ends of said upright members in vertically adjusted position, said top rail having an elongated horizontal top edge, an elongated horizontal bottom rail extending from said inner upright member to said outer upright member, means securing said bottom rail to the lower ends of said upright members in vertically adjusted position, said bottom rail having an elongated horizontal bottom edge, an elongated horizontal top extension bar parallel to said top rail, means securing said top extension bar to said top rail in horizontally adjusted position, said top extension bar having a laterally outer end adapted to extend laterally outwardly beyond said top rail, an elongated horizontal bottom extension bar parallel to said bottom rail, means securing said bottom extension bar to said bottom rail in horizontally adjusted position, said bottom extension bar having a laterally outer end adapted to extend laterally outwardly beyond said bottom rail, vertically spaced hinges having hinge plates adjacent said inner side edge of said inner upright member for mounting said inner upright member in a door jamb in vertically adjusted position so that said template may be mounted in vertically adjusted position in the door jamb, a drill plate having upper and lower end portions and a vertical outer side edge and formed between its ends with openings for locating a drill to form holes in the door for hardware, means for mounting said drill plate on the template comprising a pair of elongated horizontal intermediate rails between and vertically spaced from said top and bottom rails, means securing said intermediate rails to said upright members in vertically spaced relation to one another, each intermediate rail having an elongated intermediate extension bar parallel thereto, means securing said intermediate extension bars to said respective intermediate rails in horizontally adjusted position, said intermediate extension bars having laterally outer ends adapted to extend laterally outwardly beyond said outer upright member, and means for securing the upper and lower end portions of said drill plate to the outer ends of said respective intermediate extension bars in vertically adjusted position with its vertical outer side edge aligned with the outer ends of said top and bottom extension bars, the proper door size being adapted to be transferred to a door blank by laying the template after suitable adjustment over the door blank and running a marker in a straight line connecting said hinge plates, along the top and bottom edges of said top and bottom rails, and in a straight line connecting the outer ends of said top and bottom extension bars and along the outer side edge of the drill plate.

2. A door template as defined in claim 1, and further including vertically elongated slots in said inner upright member for mounting said hinge plates thereto in vertically adjusted position.

* * * * *